US012741851B2

(12) United States Patent
Eberhardt et al.

(10) Patent No.: US 12,741,851 B2
(45) Date of Patent: Sep. 22, 2026

(54) MOBILE CRANE WITH ADJUSTABLE COUNTERWEIGHT DEVICE

(71) Applicant: Liebherr-Werk Ehingen GmbH, Ehingen/Donau (DE)

(72) Inventors: Lars Eberhardt, Staig (DE); Bernd Boos, Mehrstetten (DE)

(73) Assignee: LIEBHERR-WERK EHINGEN GMBH, Ehingen/Donau (DE)

( * ) Notice: Subject to any disclaimer, the term of this patent is extended or adjusted under 35 U.S.C. 154(b) by 214 days.

(21) Appl. No.: 18/431,395

(22) Filed: Feb. 2, 2024

(65) Prior Publication Data

US 2024/0262659 A1 Aug. 8, 2024

(30) Foreign Application Priority Data

Feb. 3, 2023 (DE) ................ DE10 2023 102 707.7

(51) Int. Cl.
*B66C 23/76* (2006.01)

(52) U.S. Cl.
CPC .................................... *B66C 23/76* (2013.01)

(58) Field of Classification Search
CPC ...................................................... B66C 23/76
See application file for complete search history.

(56) References Cited

U.S. PATENT DOCUMENTS 3,236,391 A * 2/1966 Kennedy ................ B66C 23/76 212/196
3,378,148 A * 4/1968 Stanley .................. B66C 23/76 212/196
10,865,079 B2 * 12/2020 Pech ...................... B66C 23/76
2016/0221804 A1 * 8/2016 Torghele ................ B66C 23/76
(Continued)

FOREIGN PATENT DOCUMENTS

| | | | | |
|---|---|---|---|---|
| CN | 114436137 A * | 5/2022 | ............ | B66C 23/76 |
| DE | 3912868 C1 * | 8/1990 | ............ | B66C 23/74 |
| DE | 202014008661 U1 | 12/2014 | | |

(Continued)

OTHER PUBLICATIONS

Japanese Patent Office, Office Action Issued in Application No. 2024-012533, Apr. 22, 2025, 22 pages. (Submitted with Machine Translation).

*Primary Examiner* — Timothy D Collins
*Assistant Examiner* — Nathaniel L Adams
(74) *Attorney, Agent, or Firm* — McCoy Russell LLP

(57) ABSTRACT

A mobile crane comprising a moveable undercarriage, an upper carriage mounted on the undercarriage so as to rotate about a vertical upper carriage axis of rotation and having a ballasting device, and a counterweight device that can be coupled to the ballasting device and comprises a counterweight base plate and at least one connecting element extending from the counterweight base plate for lifting and coupling the counterweight device to the ballasting device. The first arm in the ballasted state is connected to the counterweight base plate via a pivotable coupling element, which is pivotably mounted relative to the first arm and the counterweight base plate in such a way that the counterweight base plate can be adjusted in a linear movement radially to the upper carriage axis of rotation by simultaneously pivoting the first arm and the coupling element.

20 Claims, 6 Drawing Sheets

(56) References Cited

U.S. PATENT DOCUMENTS

| | | | | |
|---|---|---|---|---|
| 2022/0024731 | A1* | 1/2022 | Yang | B66C 23/76 |
| 2024/0034600 | A1* | 2/2024 | Eberhardt | B66C 23/76 |

FOREIGN PATENT DOCUMENTS

| | | | | |
|---|---|---|---|---|
| DE | 102016008822 | B4 | 1/2018 | |
| DE | 102016009013 | A1 * | 2/2018 | B66C 23/76 |
| DE | 202021106818 | U1 | 5/2022 | |
| EP | 3878795 | A1 | 9/2021 | |
| JP | 2016137998 | A | 8/2016 | |

* cited by examiner

MOBILE CRANE WITH ADJUSTABLE COUNTERWEIGHT DEVICE

CROSS REFERENCE TO RELATED APPLICATION

The present application claims priority to German Patent Application No. 10 2023 102 707.7 filed on Feb. 3, 2023. The entire contents of the above-listed application are hereby incorporated by reference for all purposes.

TECHNICAL FIELD

The present disclosure relates to a mobile crane.

BACKGROUND

Mobile cranes typically have an undercarriage with a wheeled or crawler chassis, an upper carriage mounted on the undercarriage so that it can rotate about a vertical axis, a boom attached to the upper carriage so that it can pivot, and a counterweight device also known as an upper carriage ballast. In every position of the upper carriage, the counterweight applies a counter-torque to the load torque via a lever arm and therefore rotates with the upper carriage.

SUMMARY

While smaller mobile cranes often carry all equipment for use on the construction site as so-called taxi cranes, even on public roads, larger mobile cranes are not able to do this, making it necessary to dismantle crane components and in particular the whole or part of the counterweight device for transport on public roads and to assemble them on site. The counterweight device on crawler cranes also typically has to be dismantled for transport and fitted to the upper carriage at the place of use.

It is therefore known from the prior art to provide a counterweight base plate with connecting elements for detachable connection to the upper carriage, on which counterweight elements can be stacked. For this purpose, the upper carriage is equipped with a ballasting device that is able to pick up the counterweight device comprising the counterweight base plate and the counterweight elements stacked on it at the connecting elements from the floor or from a storage area on the undercarriage and lift it to the upper carriage for assembly. For disassembly, the counterweight base plate with the counterweight elements can be placed back on the floor or the undercarriage. For this purpose, the ballasting device usually comprises one or more hydraulic ballasting cylinders that extend downwards, are brought into engagement with the connecting elements of the counterweight device and lift the counterweight device onto the upper carriage by retracting.

In the prior art, cylindrical or flat receiving tubes are used as connecting elements, which are immovably connected to the counterweight base plate, for example welded, and project vertically upwards therefrom. The counterweight elements have corresponding recesses through which the connecting elements protrude, so that when stacked, the ballasting cylinders can be brought into engagement with the receptacles of the connecting elements from above, for example in combination with a rotary movement of the upper carriage.

To assemble the counterweight device, it is usually placed on a storage area on the undercarriage and the counterweight elements are stacked on the counterweight base plate. The upper carriage rotates with its ballasting device over the stacked counterweight device and the ballasting cylinders pull it by the connecting elements to the upper carriage. Due to this assembly method, the size of the mountable volume of the counterweight device is limited. In particular, the counterweight device cannot extend arbitrarily far from the vertical axis of rotation of the upper carriage or upper carriage axis of rotation. Here, the undercarriage typically has other components such as a driver's cab, an engine housing, exhaust gas aftertreatment components or similar, so that the counterweight device cannot extend into this area. The counterweight device cannot extend closer to the vertical axis of rotation of the upper carriage either, as this is where the steel structure of the upper carriage is located. If the mass of the counterweight is to be increased further, this can only be achieved by increasing the specific weight of the counterweight elements while maintaining the same volume. However, this makes the production and procurement of counterweight elements complex and expensive.

It is known from DE 20 2014 008 661 U1 that the distance between the ballasting cylinders and the upper carriage axis of rotation can be changed to increase the counterweight torque. This distance can be fixed before setting up the counterweight. The disadvantage of this solution, however, is that the counterweight radius can no longer be changed during crane work and therefore cannot be adapted to the prevailing space conditions on the construction site, for example during a particular rotating movement. In addition, mobile cranes with a variable support base have an additional tipping criterion.

Other solutions, such as the one in DE 10 2016 009 013 A1, use pivotable counterweight base plates. However, the assembly of such counterweight devices is complex, as the counterweight devices carry their own ballasting cylinders to press themselves against the upper carriage from below. A hydraulic connection to the ballasting cylinders of the counterweight device must therefore be established before the counterweight is set up. Furthermore, a secure, stable mounting of the counterweight device on the ballasting cylinders must be ensured so that it does not tilt when pushed up. In addition, such solutions are more suitable for larger mobile cranes that use towers of stacked counterweight elements, making the use of standardized counterweight elements worthwhile.

Against this background, the object of the present disclosure is to provide a counterweight device for generic mobile cranes that allows the generated counter-torque to be changed during operation and, in particular, is suitable for smaller mobile cranes with fewer counterweight elements.

According to the disclosure, this object is achieved by a mobile crane.

According to the disclosure, a mobile crane is proposed that comprises a mobile undercarriage, an upper carriage mounted on the undercarriage such that it can rotate about a vertical upper carriage axis of rotation, and a counterweight device. In particular, a boom, for example a telescopic boom, is articulated to the upper carriage in a luffing manner. The upper carriage comprises a ballasting device to which the counterweight device can be detachably coupled in order to generate a counter-torque that counteracts the lifted load during operation.

The counterweight device comprises a counterweight base plate and at least one connecting element for lifting the counterweight device and for coupling the counterweight device to the ballasting device of the upper carriage. The at least one connecting element extends from the counterweight base plate and is connected thereto. In particular, it extends essentially perpendicular to the counterweight base plate. The ballasting device comprises at least one first arm, which is pivotably mounted on the upper carriage about a vertical axis of rotation and enables the distance from the counterweight device to the upper carriage axis of rotation to be adjusted in the ballasted state. The counterweight device is directly or indirectly connected to the at least one first arm, so that a movement of the first arm results in a movement of the counterweight device.

According to the disclosure, the first arm is connected to the counterweight base plate in the ballasted state via a pivotable coupling element. If there is a plurality first arms, each first arm is connected to a corresponding coupling element. The at least one coupling element is pivotably mounted relative to the associated first arm and to the counterweight base plate in such a way that the counterweight base plate can be adjusted or changed in a linear movement radially to the upper carriage axis of rotation by simultaneously pivoting the first arm and the coupling element.

Due to the combination of the first arm and the coupling element according to the disclosure, both of which are pivotable, it is possible to change the counterweight radius not by pivoting the counterweight on a circular path, but by a linear movement of the counterweight device radially to the vertical axis of rotation of the upper carriage, i.e. parallel to a longitudinal axis of the upper carriage. This makes it possible to flexibly adjust the counter-torque generated by the counterweight device during crane operation and, in particular, does not require any additional space to the side of the upper carriage or the counterweight device, as no counterweight is pivoted out to the side. This makes life easier, in particular in confined construction site environments.

In addition, the undercarriage only requires a single deposit device or a single storage area for the counterweight device, as the counterweight radius is adjusted during operation in the ballasted state and not when setting up the counterweight. The undercarriage can therefore have an optimized, space-saving design.

Preferably, the at least one first arm can be actively pivoted via at least one actuator, in particular a hydraulic cylinder. The adjustment of the counterweight device via the at least one actuator can preferably be carried out centrally via a crane control system, wherein the operator can preferably make the corresponding entries from the driver's cab.

If, for the sake of simplicity, only "the connecting element" is referred to in the following, this should be understood as the at least one connecting element, i.e. including any other existing connecting elements. In addition, absolute specifications such as "vertical" and "horizontal" always refer to the case that the mobile crane is standing on a level, horizontal surface.

Preferably, the at least one connecting element is designed as a sheet metal structure with a substantially flat shape in particular. Such a sheet metal structure is easier to manufacture than, for example, a cylindrical support tube and can be manufactured with a suitable thickness to withstand the various loads acting along and transverse to its longitudinal axis.

The connecting element can have a stop element for attaching a stop means (e.g. a chain or a rope) of a hoist for lifting the counterweight base plate. This means that the counterweight base plate including the connecting element(s) can be lifted by an auxiliary crane or the mobile crane to be set up itself and positioned on a storage area of the undercarriage, for example. Preferably, the stop element is formed by a recess in the connecting element. Hook elements, protrusions or the like are also conceivable for attaching the stop means.

In one possible embodiment, it is provided that the counterweight device comprises two spaced-apart connecting elements for coupling the counterweight device to the ballasting device. Accordingly, the ballasting device in this embodiment has two pivotable first arms, which can be pivoted together or synchronously to adjust the distance from the counterweight device to the upper carriage axis of rotation. The use of a plurality of connecting elements results in a stable connection of the counterweight device to the upper carriage. Preferably, exactly two connecting elements are provided.

In particular, the connecting elements can be arranged at the same distance from the centre of gravity of the counterweight base plate or the longitudinal axis of the upper carriage. The counterweight device is preferably symmetrical to a vertical centre plane running through the longitudinal axis of the upper carriage.

In another possible embodiment, it is provided that the first arms are arranged on the side of the ballasting device, in particular on a ballast frame connected to or formed on the upper carriage. Furthermore, the first arms are pivotable in opposite directions of rotation for linear adjustment of the distance of the counterweight device from the upper carriage axis of rotation, i.e. one of the first arms pivots clockwise while the other first arm simultaneously pivots anti-clockwise.

The synchronized, actuator-based adjustment of the first arms can be implemented in different ways.

In one possible embodiment, each of the first arms can be pivoted via its own hydraulic cylinder. In this case, suitable synchronization of the pivot movements must be ensured. This can be achieved by synchronizing the hydraulic cylinders and the associated control system. This can be realized, for example, via length sensors in the cylinders, which provide their signals to a control system that controls the hydraulic cylinders in a correspondingly synchronized manner, for example via electrically actuated valves. In this case, the static load cases can be reduced in this way (no asymmetry has to be assumed).

In an alternative possible embodiment, it is provided that only one of the first arms is pivotable via a hydraulic cylinder and the first arms are mechanically coupled to each other via a gear transmission in such a way that the first arms pivot synchronously when the hydraulic cylinder is actuated. In the present case, the term "gear transmission" means that at least two gear wheels are provided. These can be coupled together, by further gear wheels or by a connection means such as a chain. In the latter case, a chain transmission could also be referred to.

The mechanical coupling of the first arms means that synchronized control of a plurality of actuators is not necessary. Said gear transmission preferably comprises gear wheels connected to the first arms in a rotationally fixed manner, which are mechanically coupled to one another via a connection means. The coupling is not direct, as otherwise the first arms would move in the same direction. Therefore, at least one additional gear wheel is provided to reverse the direction of rotation of one of the first arms. In particular, this is freely rotatable on the upper carriage and meshes with the rotationally fixed gear wheel of one of the first arms. In particular, the rotationally fixed gear wheels are arranged collinear to the axes of rotation of the arms.

The connection means are preferably a chain, so that the synchronization drive is designed as a chain transmission or chain drive. However, a belt or one or more gear wheels can also be provided as connection means.

When the hydraulic cylinder is actuated, the gear wheel arranged on this first arm rotates with the arm and thereby moves the connection means, which, for example, moves a gear wheel mounted freely rotatably on the upper carriage, which in turn meshes with a gear wheel fixed to the other first arm. As a result, both arms perform a synchronized, counter-rotating pivot movement.

In another possible embodiment, it is provided that the ballasting device is designed to lift the counterweight device from a storage area of the undercarriage and place it on this. The storage area can be located behind the driver's cab of the undercarriage. The at least one connecting element has a coupling portion at an end opposite the counterweight base plate (i.e. facing the upper carriage or the ballasting device), via which a detachable mechanical coupling with the ballasting device can be produced. The coupling portion can comprise a receptacle into which a lifting device of the ballasting device, in particular a ballasting cylinder, can be inserted in order to establish a connection for lifting the counterweight device.

In a further possible embodiment, it is provided that the ballasting device comprises at least one hydraulic ballasting cylinder that can be detachably engaged with the coupling portion of the at least one connecting element. The coupling portion comprises a receptacle into which a coupling piece of the ballast cylinder can be inserted, in particular by rotating the upper carriage about the upper carriage's axis of rotation. In particular, the ballasting cylinder has a piston rod that can be extended downwards from the ballasting device and has the coupling piece at its end. The latter can be part of the piston rod of the ballasting cylinder, i.e. formed as one piece therewith, or a separate component connected thereto.

In particular, the coupling portion is open at the top and on at least one side. The receptacle can be designed in such a way that it allows the ballasting cylinder to be pushed in sideways (e.g. following a circular movement) and, when connected, positively blocks movement of the ballasting cylinder out of the recess in a vertical direction. In the raised state, the counterweight device can rest on or hang from the coupling piece of the at least one ballasting cylinder via the recess of the at least one connecting element.

The coupling piece can be locked in the recess, for example by means of a special locking device. Alternatively or additionally, the locking mechanism can simply be a mechanical stop that blocks any further movement of the coupling piece relative to the coupling portion.

In a further possible embodiment, it is provided that the receptacle and/or the coupling piece, have a rounded, for example crowned, contour that enables an articulated movement of the coupling piece within the receptacle in the loaded state. Such a connection allows the connecting element to pivot relative to the ballasting cylinder along various degrees of freedom, for example to compensate for movement of the ballasting cylinder along a circular path when pivoting the first arm and to allow linear displacement of the counterweight device.

In a further possible embodiment, it is provided that the ballasting cylinder comprises a cylinder jacket and a piston displaceable therein with a piston rod at the free end of which the coupling piece is located, wherein the piston is mounted in the cylinder jacket so as to be rotatable about the longitudinal axis of the piston rod. This makes it possible for the coupling piece, which is located in the receptacle of the connecting element, to rotate relative to the respective first arm during a pivoting movement of the first arm, ideally in such a way that it does not rotate relative to the receptacle of the connecting element, so that frictional forces resulting from a relative movement in the receptacle are reduced or avoided.

The ballasting cylinder can be actuated by a hydraulic system, wherein the ballasting cylinder and the hydraulic system are designed such that in the ballasted state the piston rod is blocked against extension and rotation in a locking mode, while in an adjusting mode the piston rod can be rotated relative to the cylinder jacket with the same extension position.

In locking mode, the ballasting cylinder is therefore hydraulically blocked, while the piston rod can be rotated about its longitudinal axis to adjust the counterweight radius in adjusting mode. In adjusting mode, the piston rod is preferably extended further than in locking mode. The counterweight device is preferably pressed against the upper carriage by the ballasting cylinders and fixed there by hydraulic blocking (locking mode). Hydraulic blocking can take place, for example, after a defined contact pressure has been reached. An additional mechanical connection, for example by one or more bolt connections, can optionally be provided. Due to the resistance generated by the hydraulic blocking, the ballast cylinders must first be released to adjust the counterweight radius. If the counterweight device is to be adjusted, the hydraulic blocking is released and the piston rods of the ballasting cylinders are extended slightly. As the piston rods can rotate freely relative to the cylinders, movement relative to the mounts of the connecting elements can be avoided when pivoting the first arms.

In another possible embodiment, at least one second counterweight element that can be stacked on the counterweight base plate is provided and has at least one recess through which the at least one connecting element projects in the deposited state. In particular, the second counterweight element is plate-shaped. A plurality of second counterweight elements can be provided and stacked on the counterweight base plate.

In particular, the connecting element has the coupling portion described above for coupling with a corresponding coupling piece of a ballasting cylinder. Preferably, the coupling portion or its receptacle is arranged so that it lies within the recess of a second counterweight element in the connected state. In one or more examples, the receptacle is designed in such a way that the coupling piece of the ballasting cylinder can be positioned next to the coupling portion of the connecting element within the recess and can be retracted into the coupling portion or its receptacle by rotating the upper carriage about its vertical axis of rotation. The ballast cylinder describes a circular path and moves sideways into the receptacle. The receptacle of the corresponding second counterweight element must therefore be wider in order to allow such a circular movement when coupling the ballast cylinder with the connecting element.

The receptacle of the second counterweight element can have a mechanical stop against which the coupling piece of the ballasting cylinder strikes in a locking position in which the ballasting cylinder and the connecting element are correctly coupled to each other. The stop can be formed by a wall of the receptacle itself, resulting in a particularly simple design. Alternatively, the stop can also be realized by a separate component arranged in the receptacle.

In a further possible embodiment, a measuring device is also provided for detecting a ballasting state of the mobile crane, which is transmitted to a control unit of the mobile crane, in particular to a load torque limiter. This allows the ballasting state to be continuously monitored and any possible tilting of the crane to be recognized and prevented at an early stage. The measuring device may comprise at least one sensor by means of which an instantaneous pivoting angle of the at least one first arm can be detected.

In a further possible embodiment, it is provided that the at least one first arm of the ballasting device is connected in an articulated manner to a second arm, wherein the second arm is mounted on the first arm so as to be pivotable about a vertical axis of rotation. If a plurality of first arms is provided, each of these first arms is connected to a second arm so that it can pivot about a vertical axis of rotation. In this case, the at least one connecting element of the counterweight device can be coupled to the at least one second arm. The counterweight device is therefore not connected to the first arm(s), but to the second arm(s). The coupling may be carried out via ballasting cylinders as described above. In this case, the at least one second arm has a ballasting cylinder to lift the counterweight device over the at least one connecting element and connect it to the ballasting device.

In a further possible embodiment, it is provided that the first and second arms are coupled to each other in such a way that when a first arm is pivoted about its axis of rotation, the second arm attached to it is automatically pivoted about its axis of rotation. The two arms are therefore mechanically coupled to each other and perform a synchronized pivot movement about their respective axes of rotation, in particular in opposite directions of rotation. The movements of the arms may be synchronized with each other in such a way that their pivoting angles or angular velocities are in a fixed relationship to each other. This makes it possible to coordinate the two arms in such a way that a ballasting cylinder arranged on the second arm performs a linear movement, while each of the arms performs a pivoting movement. If two connecting elements and thus two pairs of first and second arms are provided, this results in a linear movement of the counterweight device parallel to the longitudinal axis of the superstructure, wherein the individual movements of the respective arms take place on circular paths.

The synchronization of the coupled first and second arms can take place in different ways.

In another possible embodiment, it is provided that the first and second arms are connected to each other via a second hydraulic cylinder, wherein the first hydraulic cylinder pivoting the first arm relative to the upper carriage and the second hydraulic cylinder pivoting the second arm relative to the first arm are controlled in a synchronized manner in such a way that the angular speeds of the first and second arms are in a fixed ratio to one another during pivoting. The coordination or synchronization of the two arms is therefore achieved here by synchronizing a plurality of hydraulic cylinders.

In an alternative possible embodiment, it is provided that the first and second arms are mechanically coupled to each other via a gear transmission in such a way that they pivot synchronously when the hydraulic cylinder pivoting the first arm relative to the upper carriage is actuated. Similarly to the mechanical coupling of two first arms described above, the first and second arms can also be synchronized via a mechanical coupling. The gear transmission that mechanically synchronizes the first and second arms may comprise a first gear wheel connected to the upper carriage in a rotationally fixed manner and a second gear wheel connected to the second arm in a rotationally fixed manner, which are coupled to each other by means of a connection means, in particular a chain. When the second arm rotates relative to the first arm, the second gear wheel rotates with the second arm. Here, too, a belt or an arrangement of further gear wheels (i.e. at least one further gear wheel) could be provided instead of a chain.

In particular, the second gear wheel is arranged collinear to the axis of rotation of the second arm and moves with the first arm when it pivots. This causes the second gear wheel to rotate relative to the upper carriage. Due to the overall rotationally fixed attachment of the first gear wheel and the coupling via the connection means, when the first arm pivots in a certain direction of rotation, the second arm, which is rotationally fixed to the second gear wheel, automatically rotates in the opposite direction of rotation.

If two first arms are provided, these can be mechanically coupled to the respective second arms via gear drives on the one hand and mechanically coupled to each other on the other, as described above. Alternatively, all or some of the arms can be pivoted using hydraulic cylinders. In particular, the following combinations are possible:

The first arms are mechanically coupled to each other and also to the respective second arms via gear transmissions, i.e. only one of the first arms can be pivoted via a hydraulic cylinder or adjustment cylinder, while the other first arm and the two second arms move automatically via the mechanical gears.

The first arms are mechanically coupled to each other via a gear transmission, wherein the second arms are each moved by hydraulic cylinders. However, this variant is less preferred, as the movements of the second arms would have to be coordinated with the first arms in a complicated manner by controlling the various hydraulic cylinders accordingly.

Both first arms can be pivoted via their own hydraulic cylinder, wherein these are matched to each other as described above and the first arms are mechanically coupled to the second arms via gear transmissions.

Both first arms can be pivoted via their own hydraulic cylinders, wherein the second arms are also each moved via hydraulic cylinders, i.e. at least four hydraulic cylinders must be coordinated.

In the embodiments described above, a linear movement of the counterweight base plate is achieved by converting a pivoting movement of the first arm (i.e. a circular path curve of the end of the first arm) into a linear movement of a free end of the second arm by synchronizing the pivoting movements via a second arm. Here, the second arm (or the second arms) therefore represents the aforementioned pivotable coupling element and both the pivoting movement of the first arm and the pivoting movement of the coupling element take place about a vertical axis of rotation.

A further solution for achieving a linear movement of the counterweight base plate parallel to the longitudinal axis of the upper carriage is realized in an alternative possible embodiment in that the at least one connecting element of the counterweight device is pivotably connected to the counterweight base plate. The at least one connecting element can be coupled to the at least one first arm, in particular via a ballasting cylinder arranged on the first arm. No second pivoting arm is provided here, but the counterweight device is connected directly to the at least one first arm.

In this embodiment, the pivoting movement of the first arm is not achieved by a second arm rotating in the opposite direction, but by the fact that the at least one connecting element is pivotably mounted and can thus virtually swerve to the side when the first arm pivots. In this case, the at least one connecting element is itself the pivotable coupling element, which is connected to the counterweight base plate.

In a further possible embodiment, as described above, two connecting elements are provided, wherein the connecting elements are each connected to the counterweight base plate so as to pivot about a horizontal pivot axis. When pivoting the first arms for linear adjustment of the counterweight device, the connecting elements thus pivot laterally, in particular perpendicular to the direction of movement of the counterweight device or to the longitudinal axis of the upper carriage, in order to compensate for the circular movements of the first arms. Adjusting the counterweight radius therefore involves a combination of a pivoting movement about a vertical axis of rotation and a further pivoting movement about a horizontal axis of rotation.

As described above, both first arms can each be driven by a hydraulic cylinder or the first arms are mechanically coupled together so that only one of the first arms needs to be driven by an actuator or hydraulic cylinder.

The pivoting of the connecting elements relative to the first arms also inevitably results in a relative movement between the coupling pieces of the ballasting cylinders arranged in particular at the ends of the first arms and the receptacles of the coupling portions of the connecting elements. This relative movement can be countered in different ways.

In a possible embodiment, it is provided that the connecting elements comprise a base body pivotably connected to the counterweight base plate and to the end of which facing the first arm or the ballasting device, respectively, a pivoting body is pivotably attached, which has a coupling portion via which a coupling to the first arm of the ballasting device can be established. The pivot body may be pivoted to the base body about a horizontal pivot axis in order to compensate for an inclined position of the connecting elements and thus ensure a constant alignment or inclination of the coupling portion relative to the first arm. In particular, as described above, the coupling portion comprises a receptacle for coupling with a ballasting cylinder of the first arm.

Alternatively, as previously explained, a rounded or crowned connection could be used between the receptacle and the coupling piece to minimize the friction of the coupling piece within the receptacle. In such a design, no pivot part needs to be provided on the connecting element.

In a further possible embodiment, it is provided that the connecting elements are each prestressed into a vertical or inwardly pivoted base position by a restoring element, in particular a spring. The restoring elements thus press the connecting elements inwards, so that when the counterweight device is adjusted, the connecting elements pivot outwards or "swerve" against the restoring forces of the restoring elements. The restoring elements can be designed as very strong springs, for example as disc springs.

In a further possible embodiment, it is provided that the connecting elements are connected to the counterweight base plate so that they can be pivoted in both directions by a maximum pivoting angle in relation to the vertical. The maximum pivoting angle or its amount may be less than 20° (i.e. $-20°<\alpha<20°$) and particularly may be less than 15° (i.e. $-15°<\alpha<15°$). In this embodiment, the recesses of any other counterweight elements placed on the counterweight base plate, through which the connecting elements protrude, must be widened accordingly so that they do not collide with the walls of the recesses during the aforementioned pivoting movement of the connecting elements.

BRIEF DESCRIPTION OF THE FIGURES

Further features, details and advantages of the disclosure result from the following exemplary embodiments explained with the help of the figures. In the figures.

DETAILED DESCRIPTION

Figure 1:
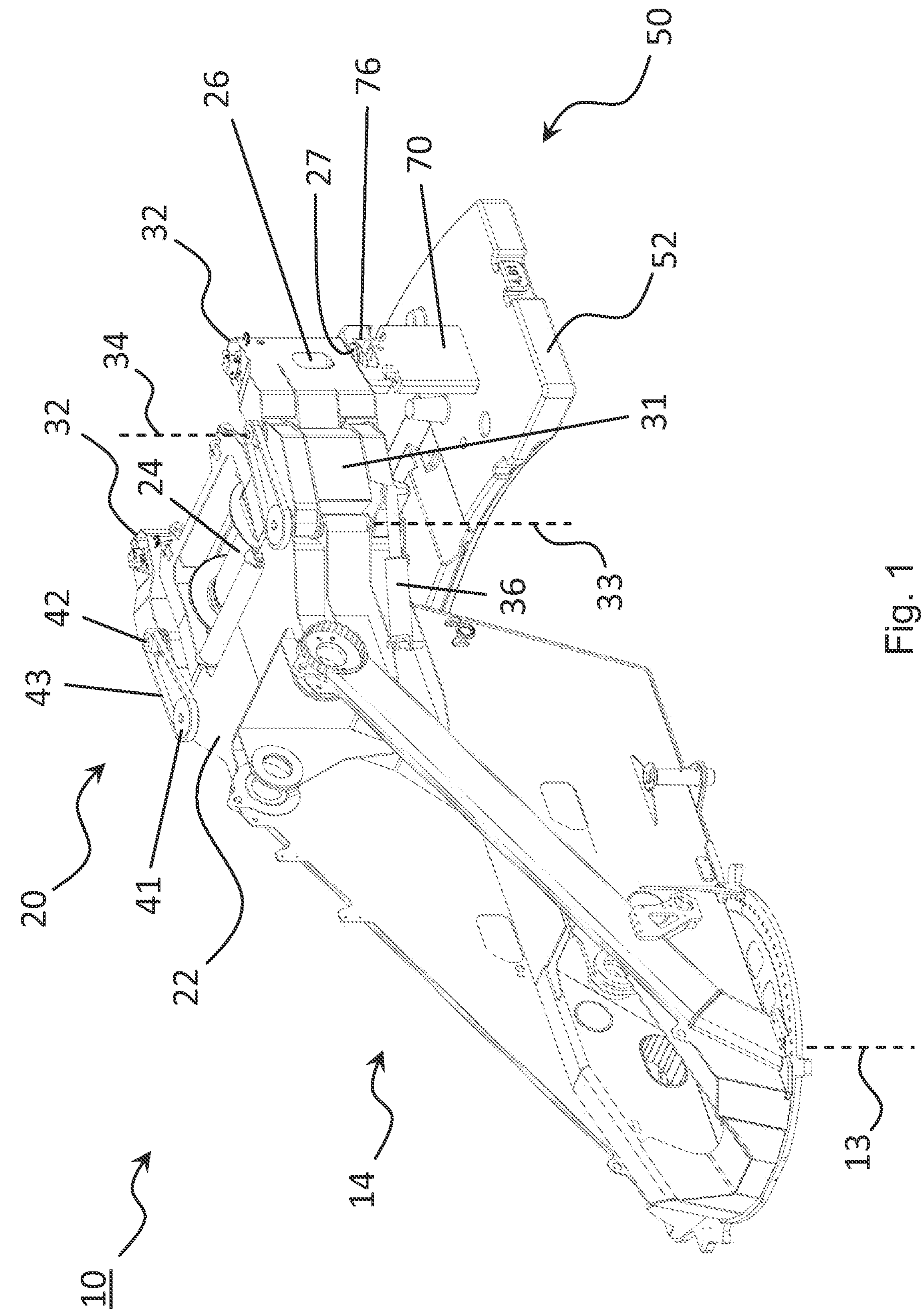
FIG. 1: shows a perspective view of the upper carriage of the mobile crane according to the disclosure according to a first exemplary embodiment.

FIG. 1 shows a perspective view of the upper carriage 14 of the mobile crane 10 according to the disclosure according to a first exemplary embodiment, wherein only the steel structure of the upper carriage 14 is shown without any covers and without the boom (which in particular is a telescopic boom) in order to provide a clear view of the components relevant here. The upper carriage 14 is mounted on a mobile undercarriage (also not shown) rotatably about a vertical upper carriage axis of rotation 13.

At its rear, the upper carriage 14 has a ballasting device 20 with a ballast frame 22, to which a counterweight device 50, also known as an upper carriage ballast, can be detachably attached in order to counteract a load lifted by the boom and prevent the mobile crane 10 from tipping over. The counterweight device 50 comprises a counterweight base plate 52 on which one or more counterweight plates can be placed or stacked (for the sake of clarity, only the counterweight base plate 52 is shown in the present figures). The ballast frame 22 can carry a winch 24.

In the exemplary embodiments discussed here, the ballasting device 20 comprises two hydraulic ballasting cylinders 26 for picking up the counterweight device 50 from a storage area of the undercarriage or setting it down thereon. After lifting the counterweight device 50 to the ballast frame 22, these can either be bolted together or the ballasting cylinders 26 press the counterweight device 50 to the ballast frame. In the latter variant, which is realized in the exemplary embodiment shown here, the ballasting cylinders 26 are hydraulically blocked once a predetermined contact pressure has been reached, so that the counterweight device 50 is held securely on the upper carriage 14. The ballasting cylinders 26 comprise pistons that are displaceably mounted in a cylinder jacket and have a piston rod that projects downwards in the direction of the undercarriage or counterweight device 50.

To mount the counterweight device 50, it is stacked on the undercarriage 12. The upper carriage 14 rotates with its ballasting device 20 via the counterweight device 50, couples to it and the ballasting cylinders 26 then pull it to the upper carriage 14, where it is held in crane operation.

The counterweight device 50 is coupled to the ballasting cylinders 26 via two connecting elements 70 projecting vertically upwards from the counterweight base plate 52, which at their upper ends facing away from the counterweight base plate 52 have coupling portions for reversible coupling to retractable and extendable coupling pieces 27 of the ballasting cylinders 26, which are located at the lower ends of the piston rods of the ballasting cylinders 26. The other counterweights that can be placed on the counterweight base plate 52 have corresponding recesses through which the connecting elements 70 protrude. These are thus placed on the counterweight base plate 52 from above and "threaded" onto the connecting elements 70 so that, in particular, the end regions of the connecting elements 70 with the coupling portions protrude at the top or remain accessible in another way.

In the exemplary embodiments shown here, the connecting elements 70 are manufactured as sheet metal constructions with a flat basic shape and can therefore also be referred to as connecting swords or simply swords. The coupling portions of the connecting elements 70 comprise a centrally arranged receptacle in the form of an upwardly open, clamp-shaped receptacle 76, into which a specially shaped (in particular mushroom-shaped) coupling piece 27 of the corresponding ballasting cylinder 26 can move laterally. In the final position, in which the counterweight device 50 can be lifted safely, the coupling piece 27 is located completely within the receptacle 76, which, due to its shape, enables the counterweight device 50 to be lifted positively by retracting the ballast cylinders 26, as the coupling piece 27 cannot slide upwards out of the receptacle 76. The extended ballast cylinders 26 are coupled to the connecting elements 70 by rotating the upper carriage 14 about its vertical axis of rotation 13.

In order to be able to adjust the distance of the counterweight device 50 from the upper carriage axis of rotation 13 along the longitudinal axis of the upper carriage (i.e. radially or perpendicularly to the upper carriage axis of rotation 13) during crane operation, i.e. in the ballasted state, the ballast frame 22 has, in all the exemplary embodiments discussed here, two pivot arms, designated here as first arms 31, which are each connected to the ballast frame 22 so as to pivot about a vertical first axis of rotation 33. The counterweight device 50 is coupled to the ballasting device 20 directly or indirectly via the pivotable first arms 31, which are pivoted about their axes of rotation 33 to change the counterweight radius. Since the ends of the first arms 31 move along circular paths, further pivotable coupling elements are provided according to the disclosure, which are arranged between the counterweight base plate 52 and the first arms 31 and ensure that, despite the pivoting movements of the first arms 31, there is an overall linear movement of the counterweight device 50 along the longitudinal axis of the upper carriage.

In the first exemplary embodiment illustrated in FIG. 1, this linear movement is made possible by the fact that a further pivot arm, designated as second arm 32, is articulated to each end of the first arms 31, wherein the second arms 32 are connected to the first arms 31 so as to pivot about a second vertical axis of rotation 34. In this embodiment, the second arms 32 represent the aforementioned pivotable coupling elements. The ballasting cylinders 26 are located at the free ends of the second arms 32, which enable coupling to the connecting elements 70 of the counterweight device 50.

When the counterweight device 50 is retracted (movement in the direction of the upper carriage axis of rotation 13), the first arms 31 pivot outwards from the position shown in FIG. 1, while the second arms 32 simultaneously pivot inwards. The two first arms 31 pivot in opposite directions of rotation, as do the two second arms 32. The first and second arms 31, 32 on one side of the ballast frame 22 also pivot in opposite directions of rotation. This superimposition of two counter-rotating pivoting movements about two vertical axes 33, 34 per side results in an overall linear movement of the ballasting cylinders 26 and thus of the entire counterweight device 50. During this movement, the connections between the ballast cylinders 26 and the connecting elements 70 always remain under load.

In the exemplary embodiment shown in FIG. 1, both first arms 31 can each be pivoted via a hydraulic adjusting cylinder 36. The adjusting cylinders 36 are connected in an articulated manner both to the upper carriage 14 and to the first arms 31, wherein the first arms 31 can have laterally projecting lugs 37 for this purpose (see FIG. 2), on which the adjusting cylinders 36 are mounted. The two adjusting cylinders 36 are controlled in a synchronized manner via a hydraulic system and a control unit in such a way that the first arms 31 pivot synchronously but in opposite rotational directions. To synchronize the adjusting cylinders 36, suitable sensors such as length sensors can be provided in or on the adjusting cylinders 36, which transmit their signals to the control unit.

In principle, the second arms 32 could also be pivoted relative to the first arms 31 via their own adjusting cylinders, which are connected in an articulated manner to the first and second arms 31, 32. Here too, suitable synchronization with each other and with the adjusting cylinders 36 of the first arms 31 would have to be ensured.

In the exemplary embodiment of FIG. 1, however, the second arms 32 are mechanically coupled to the first arms 31 so that the second arms 32 automatically rotate about their axes of rotation 34 when the first arms 31 are pivoted. In this exemplary embodiment, the mechanical coupling is produced via gear or chain transmissions. The following consideration relates to one side of the ballasting device 20 and thus to one of the two pairs of first and second arms 31, 32.

A first gear wheel 41 is rotationally fixed, i.e. immovably attached to the ballast frame 22, collinear to the first axis of rotation 33. If the first arm 31 pivots, the first gear wheel 41 does not rotate with it. A second gear wheel 42 is rotationally fixed to the end of the second arm 32 pointing towards the first arm 31 and is arranged collinear to the second axis of rotation 34. If the second arm 32 rotates relative to the first arm 31, the second gear wheel 42 also rotates relative to the first arm 31. The two gear wheels 41, 42 are coupled together via a chain 43 (=connection means). If the first arm 31 is now pivoted about the first axis of rotation 33 by means of the adjusting cylinder 36, it also pivots about the rotationally fixed first gear wheel 41. Due to the mechanical coupling via the chain 43, this pivoting movement of the first arm 31 drives the second arm 32. This pivots in the opposite direction to the first arm 31 about the second axis of rotation 34.

The first gear wheel 41 has a larger diameter than the second gear wheel 42, resulting in a defined transmission ratio. As a result, the second arm 32 rotates about the second axis of rotation 34 at a higher angular speed than the first arm 31 about the first axis of rotation 33. This is necessary in order to achieve an overall linear movement of the ballasting cylinder 26. The first gear wheel 41 can thus be designed or designated as a large gear and the second gear wheel 42 as a pinion.

The pivoting movement of the second arm 32 results in a rotation of the ballasting cylinder 26 relative to the associated connecting element 70. This would result in a relative movement between the coupling piece 27 and the receptacle 76, which would lead to increased friction. To avoid this, the piston rods of the ballast cylinders 26 can be mounted in the cylinder housings so that they can rotate about their longitudinal axes. Thus, no relative movement between the coupling pieces 27 and the receptacles 76 must be assumed. However, in the absence of further fastening elements, it is necessary for the ballasting cylinders 26 to press the counterweight device 50 against the ballasting device 20 during crane operation. For this purpose, they are hydraulically blocked once sufficient contact pressure has been reached (locking mode). In order to achieve rotation of the piston rods of the ballasting cylinders 26 to adjust the counterweight radius against this friction, the ballasting cylinders 26 must be released (i.e. the hydraulic blocking released), the piston rods extended slightly downwards and only then can the new counterweight radius be set in the position thus reached (adjusting mode).

The counter-torque generated by the counterweight device 50 can be monitored by sensors, which forward the data to a load torque limiter of the mobile crane 10. This can be done by detecting the pivoting angles of the first and/or second arms 31, 32 and/or by directly measuring the distance of the counterweight device 50 from the upper carriage 14.

Figure 2:
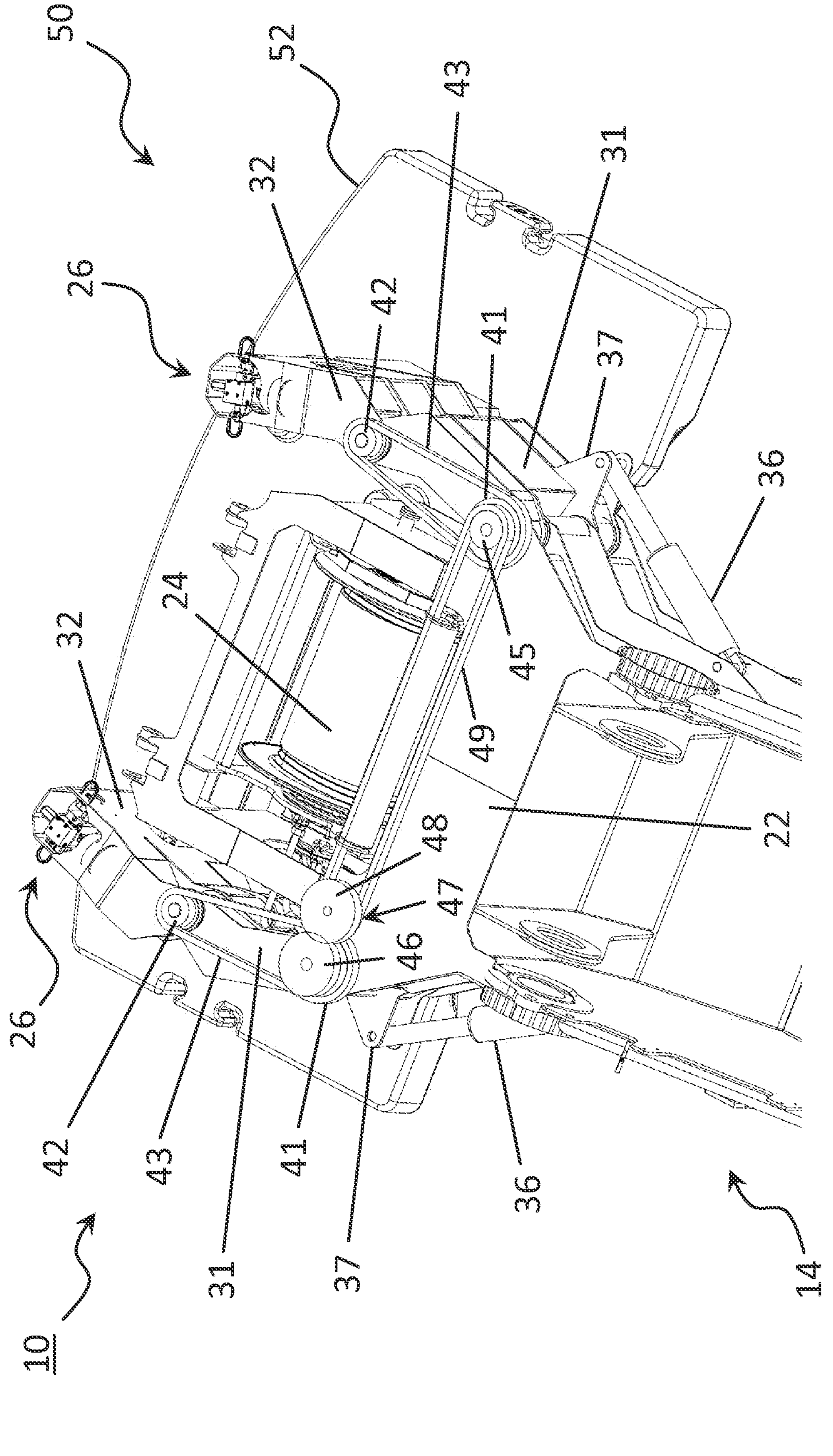
FIG. 2: shows a perspective view of the upper carriage of the mobile crane according to the disclosure according to a second exemplary embodiment.

As an alternative to using two synchronized adjusting cylinders 36 for pivoting both first arms 31, only a single adjusting cylinder 36 can be provided and the two first arms 31 can be mechanically coupled to each other. A corresponding second exemplary embodiment is shown in FIG. 2 in a perspective view of the upper carriage 14. In this case, the two first arms 31 are mechanically coupled to one another via a gear or chain transmission, wherein only one of the two first arms 31 can be pivoted via an adjusting cylinder 36 and the other first arm 31 moves automatically and synchronously.

FIG. 2 shows three exemplary embodiments. The adjustment via two adjusting cylinders 36 and the adjustment via the chain 49 are shown. It would also be possible to use the chain 49 as a means of synchronizing the adjusting cylinders 36.

A first gear wheel 45 is connected in a rotationally fixed manner to one of the first arms 31 (for example the arm 31 that can be pivoted by the adjusting cylinder 36) and is arranged collinear to the first axis of rotation 33. In the exemplary embodiment shown here, in which the first and second arms 31, 32 are also coupled to each other via a chain transmission, the gear wheel 45, which is rotationally fixed on the first arm 31, can be arranged above and collinear to the gear wheel 41, which is rotationally fixed on the upper carriage 14, and can be guided through the stationary gear wheel 41 to the first arm 31 via a hollow shaft, for example. During a pivoting movement of the first arm 31, the gear wheel 45 rotates relative to the gear wheel 41, which is rotationally fixed to the upper carriage 14.

A second gear wheel 46 is connected in a rotationally fixed manner to the other first arm 31 and is also arranged collinear to its first axis of rotation 33 and the gear wheel 41 there, which is connected in a rotationally fixed manner to the upper carriage 14. It is virtually the counterpart to the first gear wheel 45.

A third gear wheel 47 is freely rotatably mounted on the upper carriage 14 next to the second gear wheel 46 and is coupled to the first gear wheel 45 via a connection means in the form of a chain 49. For transmission purposes, a fourth gear wheel 48 sits on a common shaft with the third gear wheel 47 (the latter is concealed by the fourth gear wheel 48 in FIG. 2) and rotates with it. It has a larger diameter than the third gear wheel 47 and meshes with the second gear wheel 46, which also has a larger diameter than the first gear wheel 45. If the first arm 31 is now pivoted via the adjusting cylinder 36, the first gear wheel 45 and, due to the coupling via the chain 49, the third gear wheel 47 also rotate. The fourth gear wheel 48 is used to rotate the second gear wheel 46, which is connected to the other first arm 31 in a rotationally fixed manner, in the opposite direction to the first gear wheel 45, so that both first arms 31 pivot in opposite directions at the same angular speed. Due to the coupling of the first and second arms 31, 32 via further chain drives, the second arms 32 also pivot synchronously.

In FIG. 2, the synchronization drive for coupling the two first arms 31 is shown on the top of the ballast frame 22 for better visualization. However, the synchronization drive can also be arranged at a different location, for example within the steel structure of the ballast frame 22 or on the underside. This also applies to the gears coupling the first and second arms 31, 32.

Figure 3:
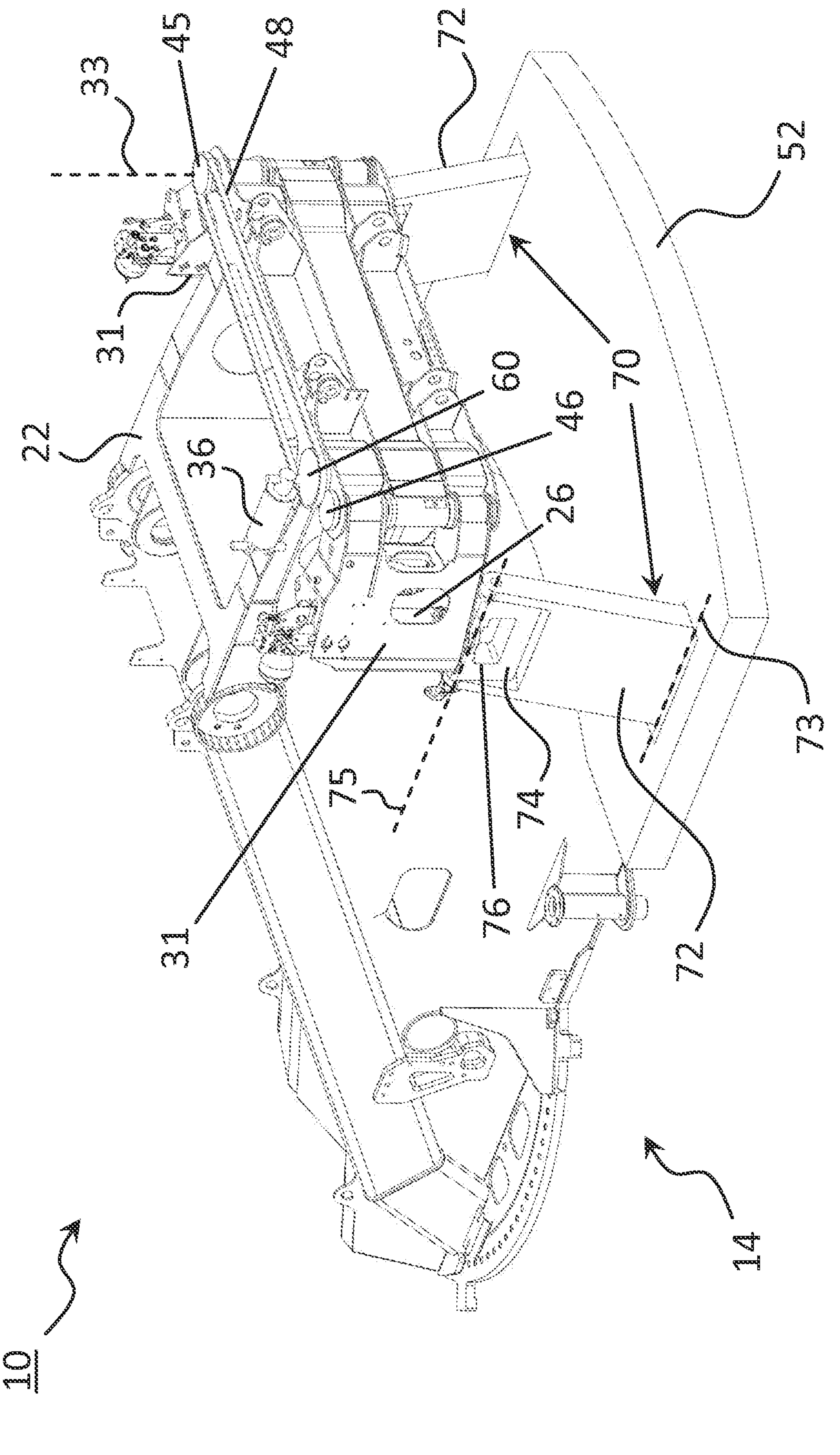
FIG. 3: shows a perspective view of the upper carriage of the mobile crane according to the disclosure according to a third exemplary embodiment.

The adjusting cylinder 36 can also be arranged at a different position or drive the first arm 31 in a different way. Another possibility is shown in FIG. 3 (this is conceivable for all the exemplary embodiments shown here). Here, the adjusting cylinder 36 is connected in an articulated manner to the ballast frame 22 and to a gear wheel 60 acting as a coupling wheel. The coupling wheel 60 drives the first and second gear wheels 45, 46, which are non-rotatably connected to the first arms (in this exemplary embodiment via a chain 48 connected to the first gear wheel 45 and a gear wheel, which is seated below the coupling wheel 60 on a common shaft and meshes with the second gear wheel 46, possibly with a suitable transmission ratio).

FIG. 2 shows a kind of combination of both exemplary embodiments for synchronizing the first arms 31, as the first arms 31 are mechanically coupled to each other via the chain transmission on the one hand and two adjusting cylinders 36 are shown at the same time. In practice, however, only one of these two adjusting mechanisms will normally be used (i.e. either two synchronized adjusting cylinders 36 or one adjusting cylinder 36 and a chain transmission).

FIGS. 3-8 show an alternative way of converting the pivoting movement of the first arms 31 into a linear movement of the counterweight device 50 parallel to the longitudinal axis of the upper carriage.

A third exemplary embodiment is shown here in the perspective view of FIG. 3 with a view of the counterweight device 50 attached to the ballasting device 20. This exemplary embodiment differs from those of FIGS. 1 and 2 in that no second arms 32 are provided, but the ballasting cylinders 26 are arranged directly at the free ends of the first arms 31.

In order to compensate for the circular movement of the ballast cylinders 26, the connecting elements 70 are not rigidly connected to the counterweight base plate 52 here, but are pivotable about a horizontal pivot axis 73. When the first arms 31 are pivoted out to the side, during which the lateral distance between the ballast cylinders 26 and the longitudinal axis of the superstructure changes, the tiltably mounted connecting elements 70 pivot with them or move out to the side accordingly.

In order to ensure a stable connection of the coupling pieces 27 of the ballasting cylinders 26 in the receptacles 76 of the connecting elements 70, the connecting elements 70 are not formed in one piece as in the previously discussed exemplary embodiments, but comprise a base body 72 that is pivotably connected to the counterweight base plate 52 and at the end of which facing the first arm 31 a further pivot body 74 is pivotably mounted about a horizontal pivot axis 75. The pivot body 74 has the coupling portion with the receptacle 76 for the ballasting cylinder 26.

On the one hand, the pivot piece 74 compensates for the tilting movement of the base body 72 and thus ensures that there is no relative pivoting movement between the receptacle 76 and the coupling piece 27. In combination with the possibility described above of rotatably supporting the piston rods of the ballasting cylinders 26 in an adjusting mode, it is even possible to prevent relative movement of any kind between the receptacle 76 and the coupling piece 27. On the other hand, the pivot body 74 can be designed in such a way that it automatically aligns itself in a vertical position due to gravity. For this purpose, the pivot axis 75 can be arranged in an upper area of the pivot body 74 so that the centre of gravity is located below the pivot axis 75. This allows the coupling piece 27 of the ballasting cylinder 26 to be coupled as usual with the vertically aligned coupling portion of the connecting element 70.

Figure 4:
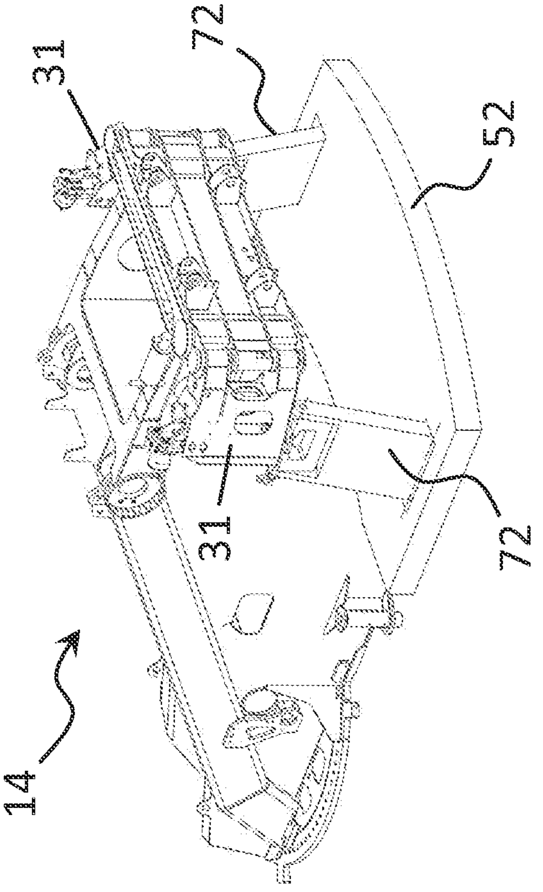
FIG. 4, FIG. 5, FIG. 6, and FIG. 7: show perspective views of the third exemplary embodiment in different positions when adjusting the counterweight device.

FIGS. 4-7 show the exemplary embodiment of FIG. 3 in four different positions of the counterweight device 50 when moving from a minimum to a maximum counterweight radius. In FIG. 4, the first arms 31 are fully folded forwards and the counterweight base plate 52 is at a minimum distance from the upper carriage axis of rotation 13. The base bodies 72 of the connecting elements 70 are pivoted inwards (i.e. in the direction of the longitudinal axis of the upper carriage).

By pivoting out or folding out the two first arms 31 to the side, the counterweight base plate 52 is removed linearly and parallel to the longitudinal axis of the upper carriage from the upper carriage axis of rotation 13. The pivoting movement of the first arms 31 is compensated by the fact that the base bodies 72 of the connecting elements 30 pivot laterally outwards (i.e. away from the longitudinal axis of the upper carriage). Here, the base body 72 also pivots relative to the pivot body 74 connected to the ballasting cylinder 26. At a certain pivoting angle of the first arms 31, the base bodies 72 are aligned vertically (see FIG. 5).

Figure 6:
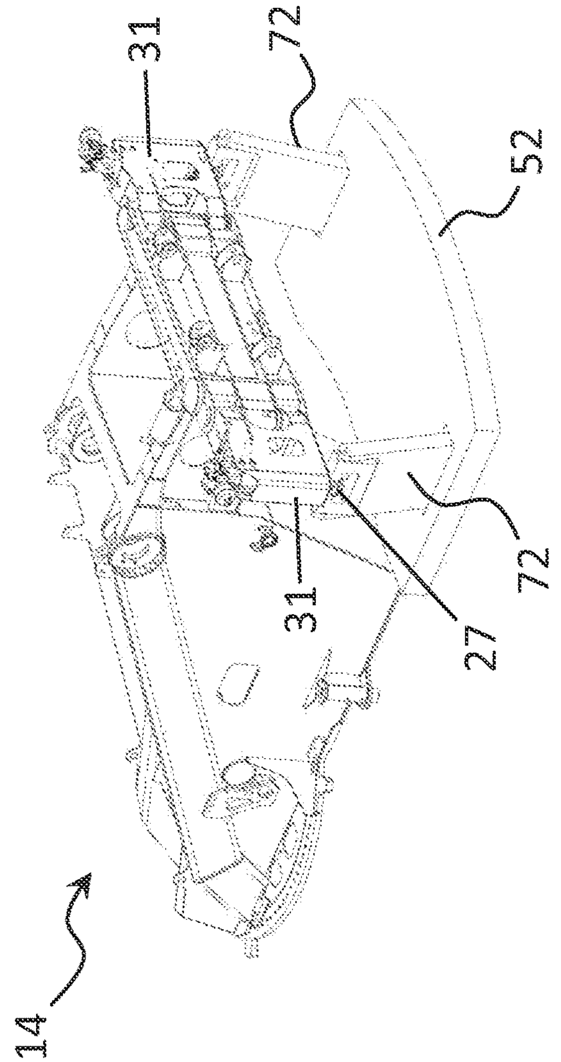

By continuing to pivot the first arms 31, the distance between the counterweight base plate 52 and the upper carriage axis of rotation 13 is further increased. Here, the base bodies 72 of the connecting elements 70 pivot laterally outwards so that they are inclined away from the longitudinal axis of the upper carriage. This position is shown in FIG. 6, wherein the first arms 31 protrude from the ballast frame 22 perpendicular to the longitudinal axis of the upper carriage, so that the ballasting cylinders 26 are at a maximum distance from the longitudinal axis of the upper carriage (this corresponds to a maximum outward pivoting angle of the base bodies 72).

Figure 7:
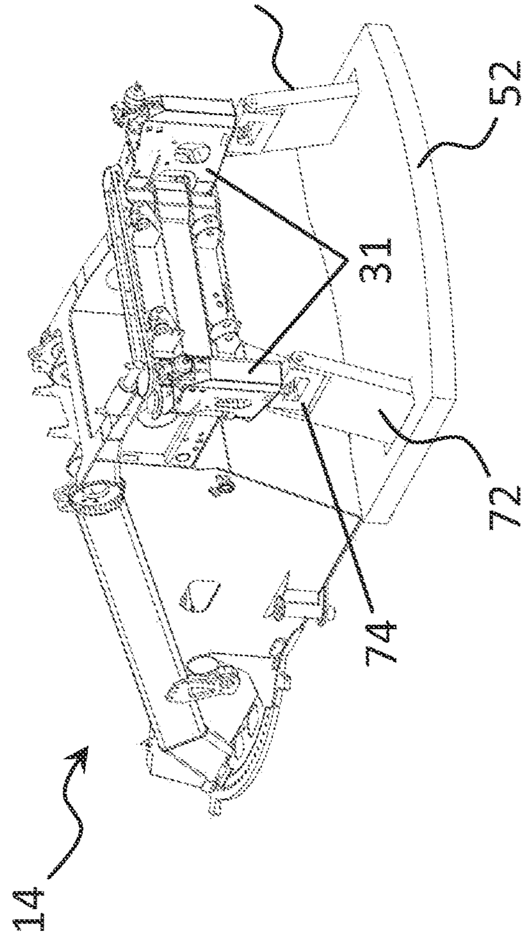

If the first arms 31 are pivoted even further, the distance between the ballasting cylinders 26 and the longitudinal axis of the upper carriage is reduced again, so that the base bodies 72 pivot back inwards, possibly even beyond the vertical position, so that they are inclined inwards again in the end position of the counterweight base plate 52 (see FIG. 7).

It should be noted here that the pivotable base bodies 72 of the connecting elements 70 assume certain limit angles outwards (see FIG. 6) and inwards (see FIG. 4 or 7) relative to the vertical, i.e. the base bodies 72 pivot within a defined angle interval. This angle interval can be smaller than [−20°20°], in one or more examples, smaller than [−15°, 15°], in relation to the vertical alignment (see FIG. 5). On the one hand, this means that any counterweight plates stacked on the counterweight base plate 52 must be provided with a corresponding free space or correspondingly wide recesses through which the base bodies 72 protrude without collision. On the other hand, the pivoting movement of the base bodies 72 about the horizontal pivot axes 73 results in a height offset 80 of the counterweight base plate 52 (see FIG. 5). This height offset 80 is not very large, for example in the range of a few centimetres (e.g. 20 mm), but the mass of the entire counterweight device 50 to be lifted is very large. The resulting stroke work must be applied by the adjusting cylinder 36 and taken into account in its boom.

Figure 5:
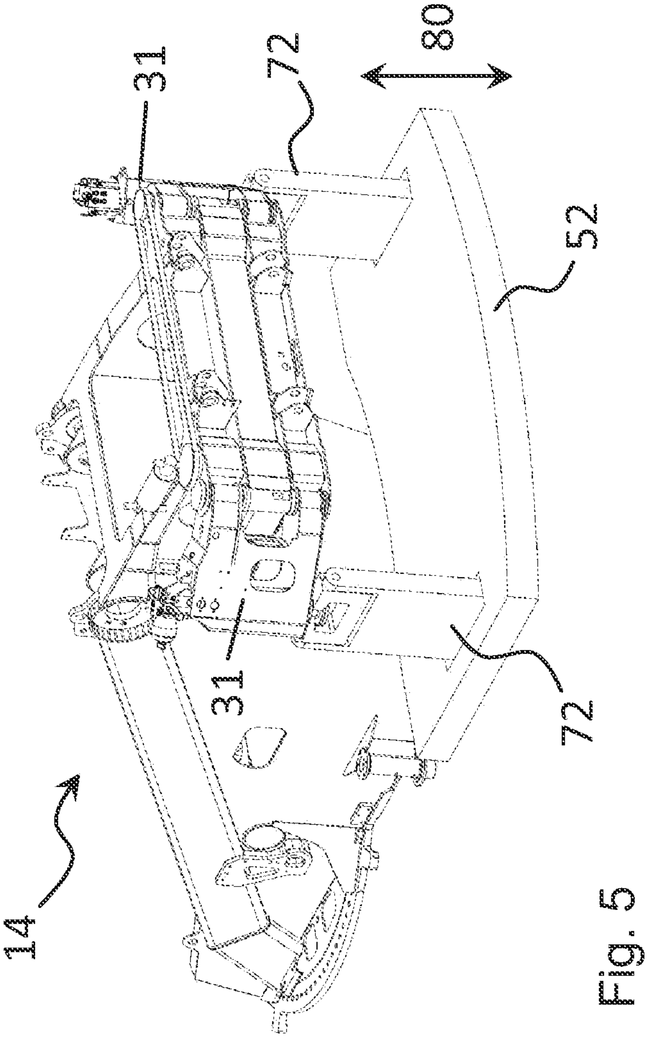

In an example embodiment, the pivotable base bodies 72 can be pressed into their base position under spring load. This can, for example, be pivoted inwards, as shown in FIG. 4, or in a vertical position, as shown in FIG. 5. The springs can be correspondingly strong, e.g. as disc springs. In the base position, the pivot body 74 with the receptacle 76 is in particular in a connection position for coupling with the coupling piece 27 of the ballasting cylinder 26.

In the third embodiment, it may also be an essential object of the ballasting cylinder 26 to press the counterweight device 50 against the ballast frame 22 (see above).

In addition, instead of a mechanical coupling of the two first arms 31 via a chain transmission, two synchronized actuated adjusting cylinders 36 can also be provided for the two first arms 31.

Figure 8:
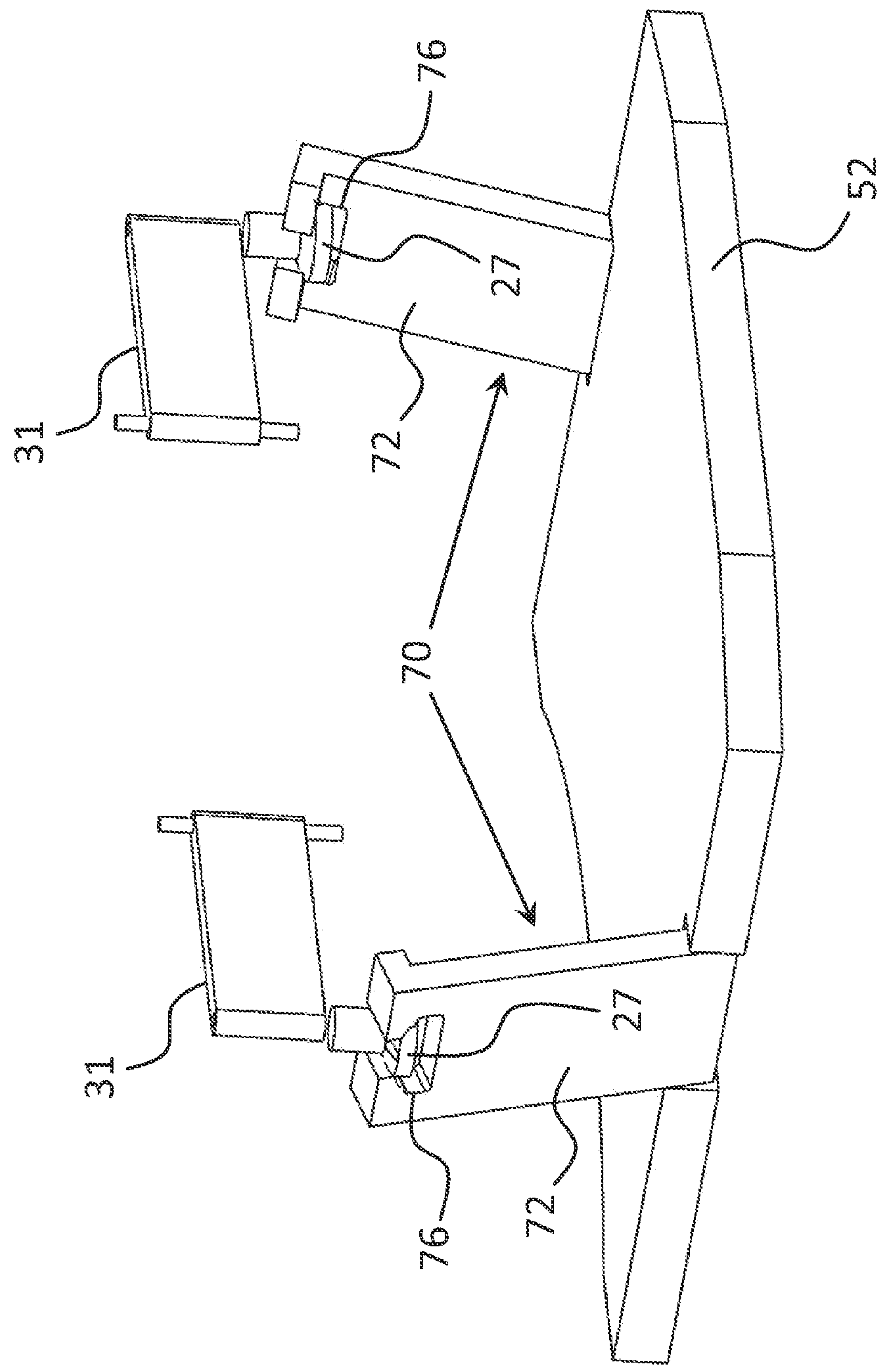
FIG. 8: shows a schematic view of the upper carriage of the mobile crane according to the disclosure according to a fourth exemplary embodiment.

Finally, an alternative way of accommodating the relative movement between the connecting element 70 and the coupling piece 27 is shown by means of a fourth exemplary embodiment in FIG. 8, wherein the first arms 31 and the counterweight device 50 are only schematically sketched here. As described above, the piston rods of the ballasting cylinders 26 with the coupling pieces 27 are also rotatably mounted in the cylinder sleeves (at least in one adjusting mode). This degree of rotational freedom relieves the frictional connection between the receptacle 76 and the coupling piece 27. In contrast to the third exemplary embodiment, however, the connecting elements 70 are formed in one piece here, wherein a pivoting movement between the connecting element 70 and the coupling piece 27 is made possible by a crowned connection. For this purpose, both the receptacle 76 and the coupling piece 27 may 27 may have correspondingly curved or rounded surfaces, resulting in a connection in the manner of a ball joint.

In the solution according to the disclosure, the undercarriage only requires a single storage device for the counterweight device 50 compared to the prior art. The counterweight radius is adjusted during crane operation and not when setting up the counterweight. The undercarriage can therefore be optimally designed without this feature.

List of Reference Numerals

10 Mobile crane
13 Upper carriage axis of rotation
14 Upper carriage
20 Ballasting device
22 Ballast frame
24 Winch
26 Ballasting cylinder
27 Coupling piece
31 First arm
32 Second arm
33 Vertical axis of rotation
34 Vertical axis of rotation
36 Hydraulic adjusting cylinder (or other linear drive)
37 Lug
41 Rotationally fixed gear wheel
42 Rotationally fixed gear wheel
43 Connection means (chain)
45 First gear wheel
46 Second gear wheel
47 Third gear wheel
48 Fourth gear wheel
49 Connection means (chain)
50 Counterweight device

52 Counterweight base plate
60 Coupling wheel
70 Connecting element
72 Base body
73 Horizontal pivot axis
74 Pivot body
75 Horizontal pivot axis
76 Receptacle
80 Height offset

The invention claimed is:

1. Mobile crane comprising a moveable undercarriage, an upper carriage mounted on the moveable undercarriage so as to rotate about a vertical upper carriage axis of rotation and having a ballast, and a counterweight that can be coupled to the ballast and comprises a counterweight base plate and at least one connector extending from the counterweight base plate for lifting and coupling the counterweight to the ballast, wherein a distance from the counterweight to the vertical upper carriage axis of rotation can be adjusted in a ballasted state via a first arm of the ballast, which can be pivoted about a vertical axis of rotation, wherein the first arm in the ballasted state is connected to the counterweight base plate via a pivotable coupler, which is pivotably mounted relative to the first arm and the counterweight base plate in such a way that the counterweight base plate can be adjusted in a linear movement radially to the vertical upper carriage axis of rotation by simultaneously pivoting the first arm and the pivotable coupler.

2. Mobile crane according to claim 1, wherein the counterweight comprises two spaced-apart connecting elements for coupling the counterweight to the ballast, wherein the ballast comprises two pivotable first arms, which can be synchronously pivoted to adjust the distance of the counterweight device from the vertical upper carriage axis of rotation.

3. Mobile crane according to claim 2, wherein the two pivotable first arms are arranged laterally on the ballast and are pivotable in opposite directions of rotation for adjusting the distance of the counterweight from the vertical upper carriage axis of rotation.

4. Mobile crane according to claim 2, wherein each of the two pivotable first arms can be pivoted via its own first hydraulic cylinder and second hydraulic cylinder, respective, and wherein the first hydraulic cylinder and the second hydraulic cylinder can be actuated synchronously.

5. Mobile crane according to claim 4, wherein the pivotable coupler is a second arm, wherein the second arm is connected to the first arm so as to be pivotable about the vertical axis of rotation, wherein the at least one connecting element of the counterweight can be coupled to the second arm.

6. Mobile crane according to claim 5, wherein the first arm and the second arm are coupled to one another in such a way that when the first arm is pivoted about an axis of rotation of the first arm, the second arm is automatically pivoted about an axis of rotation of the second arm connecting the first arm and the second arm to one another, wherein pivoting angles of the first arm and the second arm are in a fixed ratio to each other.

7. Mobile crane according to claim 6, wherein the first arm and the second arm are connected to each other, wherein the first hydraulic cylinder pivoting the first arm relative to the upper carriage and the second hydraulic cylinder pivoting the second arm relative to the first arm are controlled in a synchronised manner in such a way that angular speeds of the first arm and the second arm are in the fixed ratio to one another during pivoting.

8. Mobile crane according to claim 6, wherein the first arm and the second arm are mechanically coupled to each other via a gear transmission such that they pivot synchronously when the hydraulic cylinder pivoting the first arm relative to the upper carriage is actuated, wherein the gear transmission comprises a first gear wheel connected to the upper carriage in a rotationally fixed manner and a second gear wheel connected to the second arm in a rotationally fixed manner, which are coupled to each other.

9. Mobile crane according to claim 2, wherein one of the two pivotable first arms is pivotable via a hydraulic cylinder and the two pivotable first arms are mechanically coupled to one another via a gear transmission in such a way that they pivot synchronously when the hydraulic cylinder is actuated, wherein the gear transmission comprises gear wheels which are connected to the two pivotable first arms in a rotationally fixed manner and are coupled to one another, as well as at least one further gear wheel connected in between.

10. Mobile crane according to claim 2, wherein the ballast is configured to lift the counterweight device from a storage area of the moveable undercarriage and to deposit it thereon, wherein the at least one connector has a portion at an end opposite the counterweight base plate, via which a coupling with the ballast can be produced.

11. Mobile crane according to claim 10, wherein the ballast comprises at least one hydraulic ballasting cylinder, which can be releasably engaged with the portion of the at least one connector, wherein the portion comprises a receptacle, into which a coupling piece of the ballasting cylinder can be retracted.

12. Mobile crane according to claim 11, wherein the receptacle and/or the coupling piece have a rounded contour that enables an articulated movement of the coupling piece within the receptacle in a loaded state.

13. Mobile crane according to claim 11, wherein the ballasting cylinder comprises a cylinder jacket and a piston displaceable therein with a piston rod, at a free end of which the coupling piece is located, wherein the piston is mounted in the cylinder jacket so that it can rotate about a longitudinal axis of the piston rod, wherein the ballasting cylinder can be actuated by a hydraulic system, wherein the ballasting cylinder and the hydraulic system are designed such that in the ballasted state the piston rod is blocked against extension and rotation in a locking mode, while in an adjusting mode the piston rod can be rotated relative to the cylinder jacket with a same extension position, wherein the piston rod is extended further in the adjusting mode than in the locking mode.

14. Mobile crane according to claim 10, wherein the at least one connector of the counterweight is pivotably connected to the counterweight base plate and can be coupled to the first arm.

15. Mobile crane according to claim 14, wherein the first arm is one of multiple first arms, wherein the at least one connector is one of multiple connectors, where the multiple connectors are each pivotably connected to the counterweight base plate about a horizontal pivot axis in such a way that the multiple connectors pivot laterally when the multiple first arms are pivoted for linear adjustment of the distance from the counterweight to the upper carriage axis of rotation, in order to compensate for a circular movement of the first arm.

16. Mobile crane according to claim 15, wherein each of the multiple connectors comprises a base body pivotably connected to the counterweight base plate, at the end of which facing the first arm a pivot body is pivotably mounted about a pivot axis in order to compensate for an inclined position of the multiple connectors, wherein the pivot body has a portion, via which a coupling to the first arm of the ballast can be established.

17. Mobile crane according to claim 15, wherein the multiple connectors are each prestressed into a vertical or inwardly pivoted position by a spring.

18. Mobile crane according to claim 15, wherein the multiple connectors are connected to the counterweight base plate so as to be pivotable in both directions through a maximum pivoting angle with respect to the vertical, wherein the maximum pivoting angle is less than 20°.

19. Mobile crane according to claim 1, further comprising at least one second counterweight element that can be stacked on the counterweight base plate and has at least one recess through which the at least one connector projects in a deposited state.

20. Mobile crane according to claim 1, further comprising a measuring device for detecting a ballasting state of the mobile crane, which is transmitted to a control unit, wherein the measuring device comprises at least one sensor, via which an instantaneous pivoting angle of the first arm can be detected.

* * * * *